US009193049B2

(12) United States Patent
Gareis

(10) Patent No.: US 9,193,049 B2
(45) Date of Patent: Nov. 24, 2015

(54) CIRCUIT ARRANGEMENT FOR OPERATING A TORQUE WRENCH OR SIMILAR

(75) Inventor: Marc Gareis, Leonberg (DE)

(73) Assignee: LOESOMAT Schraubtechnik Neef GmbH, Vaihingen/Enz (DE)

( * ) Notice: Subject to any disclaimer, the term of this patent is extended or adjusted under 35 U.S.C. 154(b) by 452 days.

(21) Appl. No.: 13/697,093

(22) PCT Filed: May 6, 2011

(86) PCT No.: PCT/DE2011/001043
§ 371 (c)(1),
(2), (4) Date: Dec. 28, 2012

(87) PCT Pub. No.: WO2011/150909
PCT Pub. Date: Dec. 8, 2011

(65) Prior Publication Data

US 2013/0125715 A1 May 23, 2013

(30) Foreign Application Priority Data

May 11, 2010 (DE) ........................ 10 2010 020 258

(51) Int. Cl.

| | |
|---|---|
| ***F16D 31/02*** | (2006.01) |
| ***B25B 23/145*** | (2006.01) |
| ***F15B 9/09*** | (2006.01) |
| ***F15B 13/044*** | (2006.01) |
| ***B25B 21/00*** | (2006.01) |

(52) U.S. Cl.
CPC ............. *B25B 23/145* (2013.01); *B25B 21/005* (2013.01); *B25B 23/1456* (2013.01); *F15B 9/09* (2013.01); *F15B 13/0442* (2013.01)

(58) Field of Classification Search
CPC ..... F15B 9/09; F15B 13/0442; B25B 23/145; B25B 23/1456
See application file for complete search history.

(56) References Cited

U.S. PATENT DOCUMENTS

| | | | | |
|---|---|---|---|---|
| 4,598,626 | A * | 7/1986 | Walters | F15B 13/16 91/433 |
| 5,792,967 | A | 8/1998 | Steber et al. | |
| 6,286,412 | B1 * | 9/2001 | Manring et al. | 91/433 |
| 7,620,522 | B2 * | 11/2009 | Bredau | F15B 19/005 91/1 |
| 8,056,426 | B2 | 11/2011 | Hohmann et al. | |
| 2009/0260485 | A1 | 10/2009 | Hohmann et al. | |

FOREIGN PATENT DOCUMENTS

| | | |
|---|---|---|
| DE | 198 13 900 | 9/1999 |
| DE | 10 2004 058338 | 6/2006 |
| DE | 10 2004 059859 | 8/2006 |
| EP | 2 110 205 | 10/2009 |

OTHER PUBLICATIONS

Manovzev A.P., Fundamentals of remote control and remote monitoring, M. [Moscow], Gosenergoizdat, 1959, pp. 35 and 36.

(Continued)

*Primary Examiner* — Michael Leslie
(74) *Attorney, Agent, or Firm* — Collard & Roe, P.C.

(57) ABSTRACT

The invention relates to a circuit arrangement for operating a hydraulic torque wrench or similar, comprising a piston-cylinder unit (18) that can be controlled at a predetermined pressure by a pump (11). Said arrangement is characterized in that the piston-cylinder unit (18) can be controlled by the pump (11) by means of a proportional valve (12) which acts both as a reversing unit between the forward and return travel and as a pressure control valve.

2 Claims, 1 Drawing Sheet

(56) References Cited

OTHER PUBLICATIONS

International Search Report of PCT/DE2011/001043, Oct. 25, 2011.
English translation of the International Preliminary Report on Patentability and Written Opinion of the International Searching Authority of PCT/DE2011/001043, Nov. 22, 2012.
Chinese First Office Action in 201180026628.3, dated May 20, 2014.
Chinese Second Office Action in 201180026628.3, dated Jan. 27, 2015.

* cited by examiner

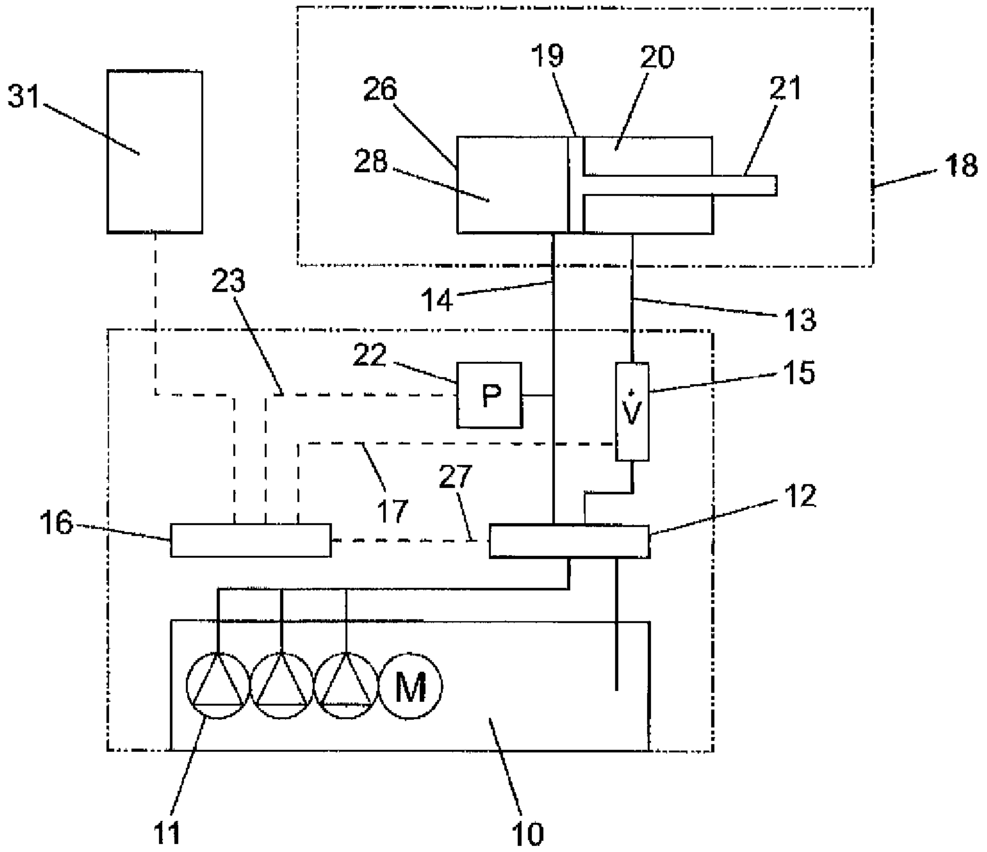
31
23
22
P
14
13
15
V̇
17
27
12
16
26
19
20
21
28
18
M
11
10

CIRCUIT ARRANGEMENT FOR OPERATING A TORQUE WRENCH OR SIMILAR

CROSS REFERENCE TO RELATED APPLICATIONS

This application is the National Stage of PCT/DE2011/001043 filed on May 6, 2011, which claims priority under 35 U.S.C. §119 of German Application No. 10 2010 020 258.4 filed on May 11, 2010, the disclosure of which is incorporated by reference. The international application under PCT article 21(2) was not published in English.

The invention relates to a circuit arrangement for operating a torque wrench or similar which has a piston-cylinder unit which can be controlled at a specifiable pressure by a pump.

Hydraulic torque wrenches of this kind are very often connected to a hydraulic unit, which includes the pump, by means of hoses which are up to 10 m long. In this way, an operator who operates a hydraulic torque wrench is no longer in sight of the hydraulic unit. However, when visually checking to see that the set pressure has actually been reached, a view of a manometer, which is arranged in the vicinity of the hydraulic unit, is essential. It is therefore the operator's wish to be able to adjust and read-off all functions of the hydraulic unit by means of a remote controller without having to seek out the present location of the hydraulic unit, which for example is remote from the torque wrench.

Various possible solutions have been offered in the prior art to solve this problem.

A first consists in pre-selecting a pressure by means of a manometer. Here, the desired pressure is usually adjusted by means of a manual pressure regulator and a manometer. An overflow valve is triggered as soon as the set pressure is reached. In this case, the set final pressure can be maintained.

A further variant relates to pre-selecting the pressure by means of a pressure switch. Here, the set desired pressure is controlled with a pressure switch. When the final pressure is reached, the pressure switch interrupts the hydraulic fluid feed. The set final pressure cannot be maintained by this method.

The first aforementioned suggestion of pre-selecting the pressure by means of a manometer has the disadvantage that the operator must carry out every adjustment or correction of the pressure himself directly at the hydraulic unit. However, as the operator together with a control unit and the hydraulic wrench are remote from the hydraulic unit when working, such an adjustment is not readily possible. A visual check of the final pressure at the manometer must also be carried out in this way at a spatial distance, as a result of which reading inaccuracies can occur. However, because the set pressure is maintained, creeping of the screw connection, that is a reduction in the clamping force due to plastic flow, can be controlled and the pressure can basically be applied for any length of time.

Although the second aforementioned variant, "pressure pre-selection by means of pressure switch", enables the pressure to be adjusted separately from the hydraulic unit, the disadvantage here is that the pressure cannot be maintained, as the switch interrupts the hydraulic feed and therefore to a certain extent the "flow pressure". Creeping of the screw connection cannot be compensated for in this way.

The invention is based on the object of providing a circuit arrangement which enables the operator to operate for example the hydraulic wrench connected to the hydraulic unit entirely by means of an operating part in the form of a remote controller and, at the same time, to also be able to control a short-term creeping of a screw connection by means of an applied pressure. This occurs because the pressure is also maintained in this case.

This object is achieved by a circuit arrangement of the kind described in that the piston-cylinder unit can be controlled by the pump by means of a proportional valve which acts both as a reversing unit between feed and return flow and as a pressure limiting unit.

The basic idea of the invention is to insert a proportional valve for very high pressures in a circuit arrangement for a hydraulic unit in the feed/return flow of the piston-cylinder unit. In doing so, the proportional valve is designed for up to 800 bar. The proportional valve can be controlled electrically, wherein the opening cross section of the valve can be varied as a function of the control variable, for example a control voltage.

Advantageous improvements and embodiments of the invention are also described herein. An advantageous improvement therefore provides that the proportional valve can be controlled from a control device. Signals of a quantity measuring means and/or a pressure measuring means arranged in the feed and/or return line can be fed back to this control device.

In order to enable control to be carried out separately from the hydraulic unit, it is provided that data can be fed to the control device by an operator by means of a remote control unit.

The control device controls the pressure applied to the piston-cylinder unit by means of the proportional valve as a function of the signals of the quantity measuring means and/or the pressure measuring means. As a result, the pressure can be regulated, which allows the pressure to be maintained and therefore also allows compensation of the aforementioned short-term creepage of screw connections.

Further advantages and characteristics of the invention are described below in conjunction with the drawing, in which a circuit diagram of a circuit arrangement according to the invention is shown schematically.

A hydraulic torque wrench has a piston-cylinder unit 18 with a piston 19 arranged in a cylinder 26, with a pressure chamber 20 on the piston-rod side arranged on sides of a piston rod 21 and with a cylinder chamber 28.

Both the pressure chamber 20 on the piston-rod side and the cylinder chamber 28 are connected to a tank 10 by means of hydraulic lines, a hydraulic return line 13, which opens out into the pressure chamber 20 on the piston-rod side, and a hydraulic feed line 14, which opens out into the cylinder chamber. A single or multi-stage pump 11, which is driven by a motor M, is arranged in the tank 10. The pump 11 itself and its motor M can be arranged in the hydraulic fluid for cooling purposes.

A proportional valve 12, which can be controlled by a control device 16 via an electrical control cable 27, is connected between the piston-cylinder unit and the tank 10. The control device 16 in turn can be set up by a remote control unit 31 via an electrical cable or wirelessly, that is to say data are exchanged between the control device 16 and the remote control unit 31.

A quantity measuring means 15 is arranged in the hydraulic return line 13. The hydraulic feed line 14 has a pressure measuring means 22. Both the output signals of the quantity measuring means 15 and the output signals of the pressure measuring means 22 are fed to the control device 16 via electrical cables 17 and 23.

The circuit arrangement is controlled by an operator (not shown) located in the vicinity of the screw connection to be produced, for example. By means of the remote control unit 31, this operator can specify required data, for example the tightening torque of the screw connection, which are fed to the control unit 16. The control unit 16 calculates a control signal for the proportional valve 12 as a function of the pressure measured by the pressure measuring means 22 and, if necessary, also as a function of the return quantity of fluid measured by means of the quantity measuring means 15. The opening cross section and therefore the pressure in the hydraulic feed line 14 and therefore in the cylinder chamber 28 varies as a function of this electrical control signal. It must be noted at this point that the quantity measuring means 15 can also be omitted. Measurement of the pressure by means of the pressure measuring means 22 is sufficient for adjusting the pressure.

With this circuit arrangement, the proportional valve 12 has two functions. Firstly, it carries out the function of a reversing unit between feed and return flow, and secondly it serves as pressure limiting means in order to set and maintain a pressure which is preset by an operator by means of the remote control unit 31. This also enables creepage processes, which occur when producing screw connections to which a very high torque is applied, to be compensated for. The proportional valve is designed for very high pressures which can be up to 800 bar.

The invention claimed is:

1. A wrench system comprising a hydraulic torque wrench and a circuit arrangement for operating the hydraulic torque wrench, the circuit arrangement having a proportional valve, a pump, and a piston-cylinder unit, the piston-cylinder unit being controllable at a specifiable pressure by the pump, wherein the piston-cylinder unit can be controlled by the pump via the proportional valve, wherein the proportional valve acts both as a reversing unit between feed and return flow and as a pressure limiting valve, wherein the wrench system further comprises a pressure measuring device disposed in a first line, the first line connecting the proportional valve and a cylinder chamber of the piston-cylinder unit, wherein the wrench system further comprises a quantity measuring device disposed in a second line, the second line connecting the proportional valve and a pressure chamber of the piston-cylinder unit disposed on a piston-rod side of the piston-cylinder unit, wherein the wrench system further comprises a control device and the control device is configured to receive signals from the pressure measuring device and from the quantity measuring device, and wherein the control device is configured to control the proportional valve as a function of the signals from the pressure measuring device and from the quantity measuring device.

2. The wrench system as claimed in claim 1, wherein the control device is set up by an operator via a remote control unit, and wherein the remote control unit is wired to the control device or communicates with the control device wirelessly.

* * * * *